(12) United States Patent
Wu et al.

(10) Patent No.: US 7,188,721 B1
(45) Date of Patent: Mar. 13, 2007

(54) ADJUSTMENT APPARATUS

(75) Inventors: Chao-Huang Wu, I-Lan Hsien (TW); Shao-Hung Yang, Chang-Hua Hsien (TW)

(73) Assignee: Chunghwa Picture Tubes, Ltd., Taipei (TW)

( * ) Notice: Subject to any disclaimer, the term of this patent is extended or adjusted under 35 U.S.C. 154(b) by 0 days.

(21) Appl. No.: 11/307,501

(22) Filed: Feb. 10, 2006

(51) Int. Cl.
*B65G 47/24* (2006.01)

(52) U.S. Cl. .................. 198/414; 193/35 MD

(58) Field of Classification Search ............... 198/400, 198/406, 412, 413, 414, 416, 782; 193/35 MD
See application file for complete search history.

(56) References Cited

U.S. PATENT DOCUMENTS

| | | | | |
|---|---|---|---|---|
| 2,789,705 A | * | 4/1957 | Payne | 193/35 MD |
| 4,456,116 A | * | 6/1984 | Jarman | 198/414 |
| 4,533,033 A | * | 8/1985 | van Wegen | 198/413 |
| 5,293,984 A | * | 3/1994 | Lucas | 198/414 |
| 5,458,226 A | * | 10/1995 | Nakao et al. | 198/379 |
| 6,019,211 A | * | 2/2000 | Masciarelli, Jr. | 193/35 MD |
| 6,129,195 A | * | 10/2000 | Matheny | 193/35 MD |
| 6,231,716 B1 | | 5/2001 | White et al. | |
| 2004/0104139 A1 | | 6/2004 | Yoshizawa | |

\* cited by examiner

*Primary Examiner*—James R. Bidwell
(74) *Attorney, Agent, or Firm*—Winston Hsu

(57) ABSTRACT

An adjustment apparatus, which is able to adjust a substrate position. The apparatus includes a plurality of transport rails, a plurality of rollers on each transport rail, a pin up device and an adjustment device. The roller is transported the glass substrate, a pin and a joinball of the pin up device are supported and are raised the substrate from the roller. Finally, an adjustment device can adjust the glass substrate.

10 Claims, 5 Drawing Sheets

ADJUSTMENT APPARATUS

BACKGROUND OF THE INVENTION

1. Field of the Invention

The present invention relates to a substrate adjustment apparatus, and more particularly to a glass substrate adjustment apparatus having a pin up device comprising a plurality of joinballs.

2. Description of the Prior Art

A substrate is the key component of an LCD monitor. It dictates the cost of the LCD, and plays a decisive role in the yield. The size of the substrate becomes bigger and bigger as LCD manufacturing techniques improve. For a $5^{th}$ generation LCD, the area of the substrate is 1300 millimeters by 1500 millimeters. The $6^{th}$ generation LCD substrate has an area of 1500 millimeters by 1850 millimeters. However, the width of the substrate still remains between 0.6 millimeters to 1.1 millimeters, which causes the substrate to be easily broken when the substrate is adjusted by a conventional adjustment apparatus. Therefore, the yield decreases.

Please refer to FIG. 1. FIG. 1 is a schematic diagram of the structure of an adjustment apparatus 100 according to the prior art. The adjustment apparatus 100 is a substrate adjustment apparatus of the LCD. Before a substrate 104 proceeds to a next process, the substrate 104 needs to first be adjusted, and then it can moves to the next tool (an inspection tool, a repair tool, etc.) utilized by a robot or a person. As shown in FIG. 1, the adjustment apparatus 100 comprises a roller 102, a transport rail 108, and an adjustment device 106. When the substrate 104 is transferred to the adjustment apparatus 100, the substrate 104 is transferred by a plurality of rollers 102 respectively disposed on the transport rails 108. Then, an adjustment device 106 wedges the substrate 104 to guide the position and direction. When the adjustment apparatus 100 achieves the adjustment of the substrate 104, the steps of produced polyemid, the repair tool, and automatic optical inspection (AOI) can proceed.

As mentioned above, the $5^{th}$ generation substrates and beyond are bigger and thinner than previous generations, so the substrate is easily broken when a robot or human puts the substrate on the adjustment apparatus directly. Therefore, the yield is decreased. It is important to overcome the shortcomings of the prior art adjustment apparatus.

SUMMARY OF THE INVENTION

The present invention relates to an adjustment apparatus to solve the above mentioned problems of the prior art.

An exemplary embodiment of the present invention is an adjustment apparatus for adjusting a substrate. The apparatus includes a plurality of transport rails, a plurality of rollers disposed respectively on the transport rails, a pin up device and an adjustment device. The roller transports the substrate. The pin up device comprises a plurality of pins and a plurality of joinballs for supporting and raising the substrate from the roller. Finally, the adjustment device can orientate the substrate.

As the substrate can use point friction from the pin and roller friction from the joinball, the substrate will not fail easily, and a robot or human being can handle the substrate. Because the substrate is raised by the pin up device, the substrate will not easily be broken when the robot or human takes the substrate. Therefore, the yield is increased. In addition, the pin and the joinball are positioned in a ratio of 1:1 so that the associated cost of the adjustment apparatus is decreased.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
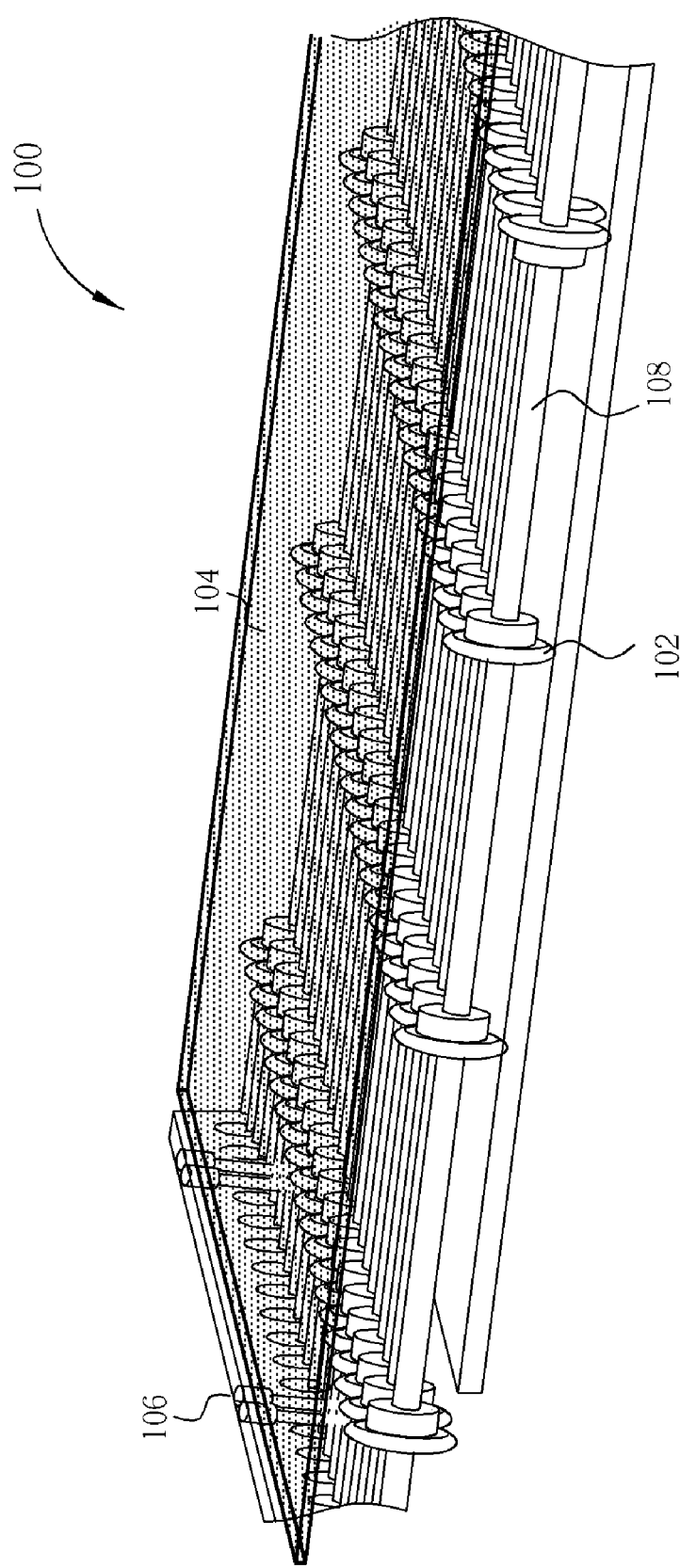
FIG. 1 is a schematic diagram of a structure of the adjustment apparatus according to the prior art.
Figure 2:
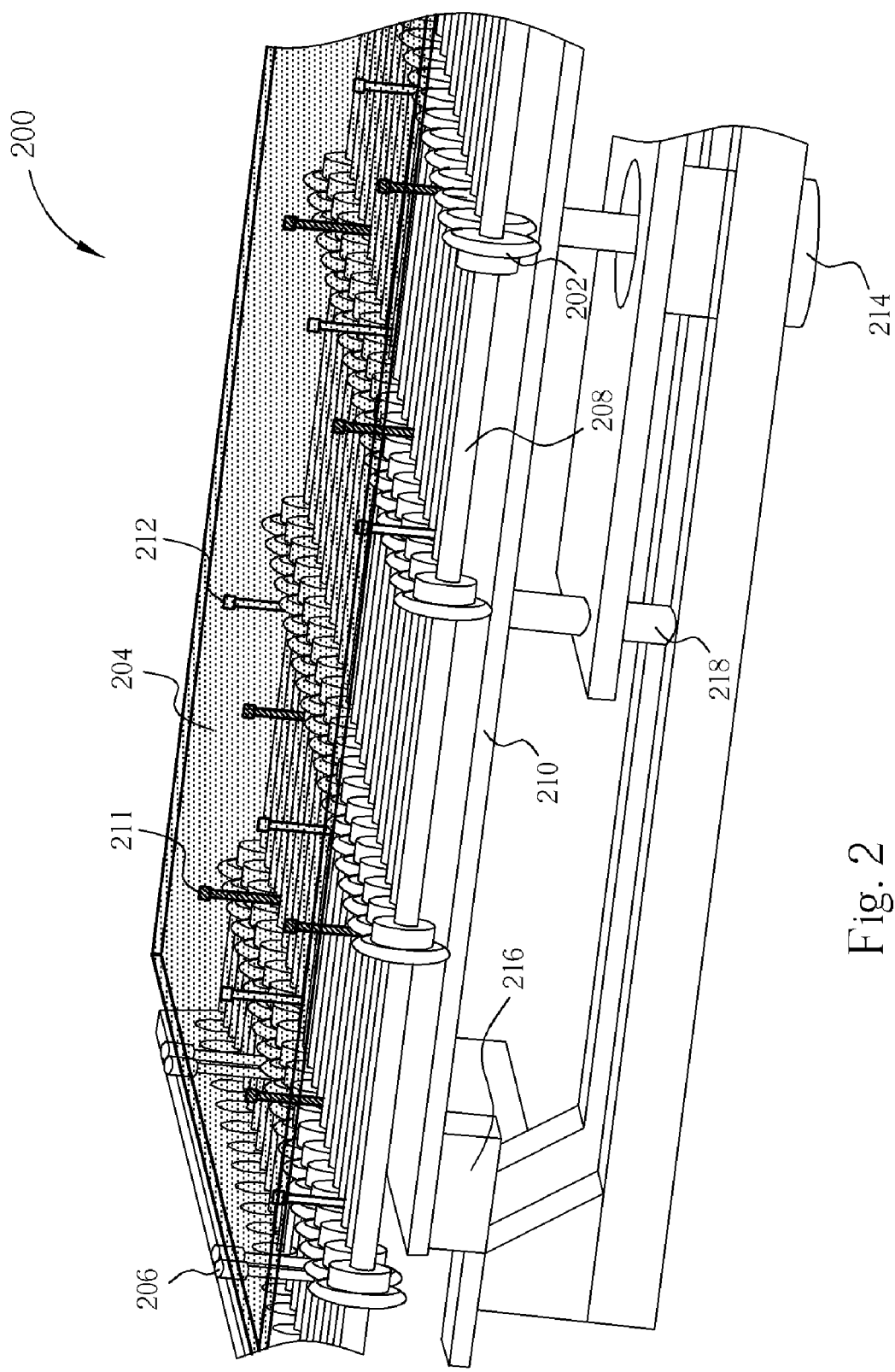
FIG. 2 is a schematic diagram of a structure of an adjustment apparatus according to an exemplary embodiment of the present invention.

Please refer to FIG. 2. FIG. 2 is a schematic diagram of a structure of an adjustment apparatus according to an exemplary embodiment of the present invention. An adjustment apparatus 200 is a substrate adjustment apparatus of a CF glass, TFT glass, or pure glass substrate. Before the substrate 204 proceeds to a next process, the substrate 204 needs to first have its position adjusted. Then, a robot or human moves the substrate to an inspection or repair tool. As shown in FIG. 2, the adjustment apparatus 200 comprises a roller 202, a transport rail 208, a pin up device 210 and an adjustment device 206. Each transport rail 208 has a plurality of rollers 202 at a fixed distance from each other. A linear bearing 218 drives the transport rails 208 for rolling the rollers 202, so the substrate 204 is moved to an adjustment device 206. The pin up device 210 is driven by a low speed pneumatic cylinder 214, and the pin up device is raised slowly. A plurality of pins 211 and a plurality of joinballs 212 support and raise the substrate 204. Each pin 211 and each joinball 212 intercrosses between the transport rail 208 and the adjacent transport rail so that the transport rails 208 and 15 the rollers 202 are not influenced by the pin up device 210 when the pin up device 210 is raised.

In addition, when the pin up device 210 is raised, the adjustment device 206 is driven by a low speed pneumatic cylinder 216 to wedge the substrate 204 by the adjustment device 206 and guide the substrate 204 to the correct direction and position. Furthermore, when the pins 211, the joinballs 212, and the adjustment device 206 contact with the substrate 204, the substrate could easily be broken. Therefore, the present invention uses the low speed pneumatic cylinders 214, 216 to avoid the above problem. The low speed pneumatic cylinders 214, 216 can also be a low speed motor. When the adjustment apparatus 200 achieves the adjustment of the substrate 204, the following steps of the produced polyemid, repair tool, and automatic optical inspection (AOI) can proceed.

Figure 3:
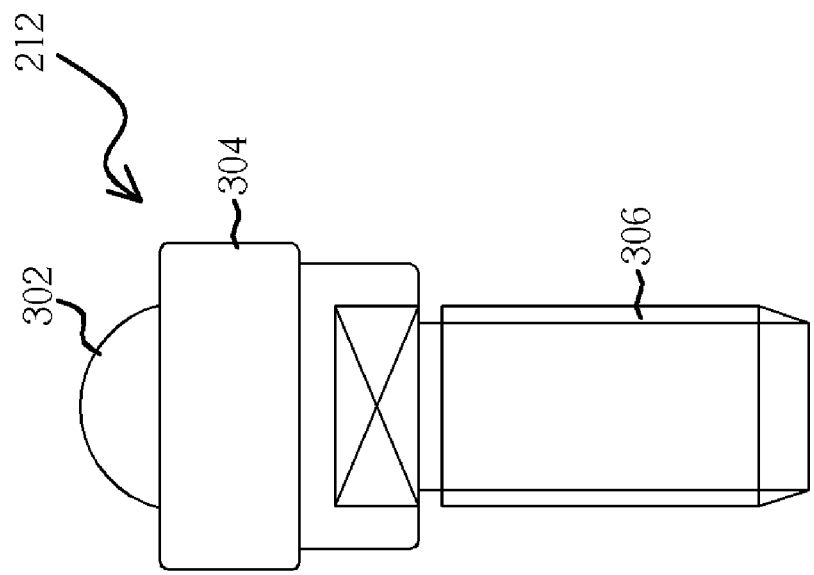
FIG. 3 is a schematic diagram of the structure of the joinball shown in FIG. 2.
Figure 4:
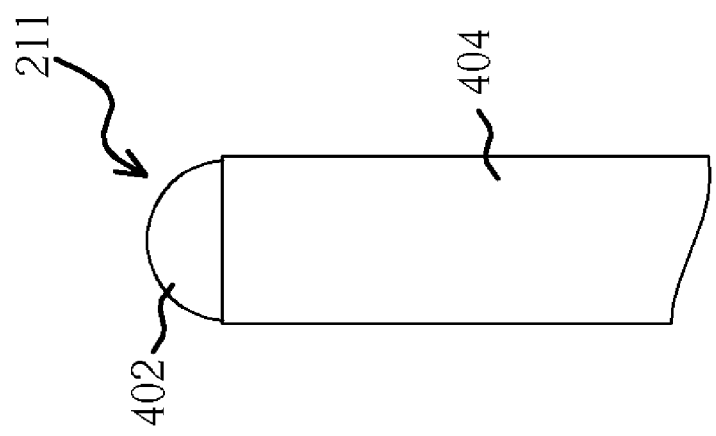
FIG. 4 is a schematic diagram of the structure of the pin shown in FIG. 2.

Please refer to FIG. 3. FIG. 3 is a schematic diagram of the structure of the joinballs shown in FIG. 2. The top of each joinball 212 has a running ball 302 put in a big curvature running ball stage 304, and the running ball stage is fixed on the top of a pillar 306. Because the running ball 302 rolls in the running ball stage freely, the running ball 302 has a good roller friction with the substrate 204. In the embodiment of the present invention, the joinball 212 can be an ISC-10 joinball, which is manufactured by ISB. Each ISC-10 joinball can support between 50 grams and 100 grams, and is therefore suitable for the present invention. Please refer to FIG. 4. FIG. 4 is a schematic diagram of the structure of the pins shown in FIG. 2. In the embodiment of the present invention, each pin 211 has a 10 millimeters radius 404, and a top of each pin 211 is a 5 millimeters hemisphere 402, where both structures are made by a peek. Because of the top 402 is an arc, it has a point friction with the substrate 204.

It is noted that the joinballs 212 and the pins 211 intercross in a ratio of 1:1 in the pin up device 210. The substrate 204 not only has the point friction of pins 211, but also has the roller friction of the joinball 212 meaning the substrate 204 will not fail easily, and also enabling a robot or human to take them easily. Also, because the cost of the joinball 212 is high, the joinballs 212 and the pins 211 intercross in a ratio of 1:1 to decrease the cost.

Figure 5:
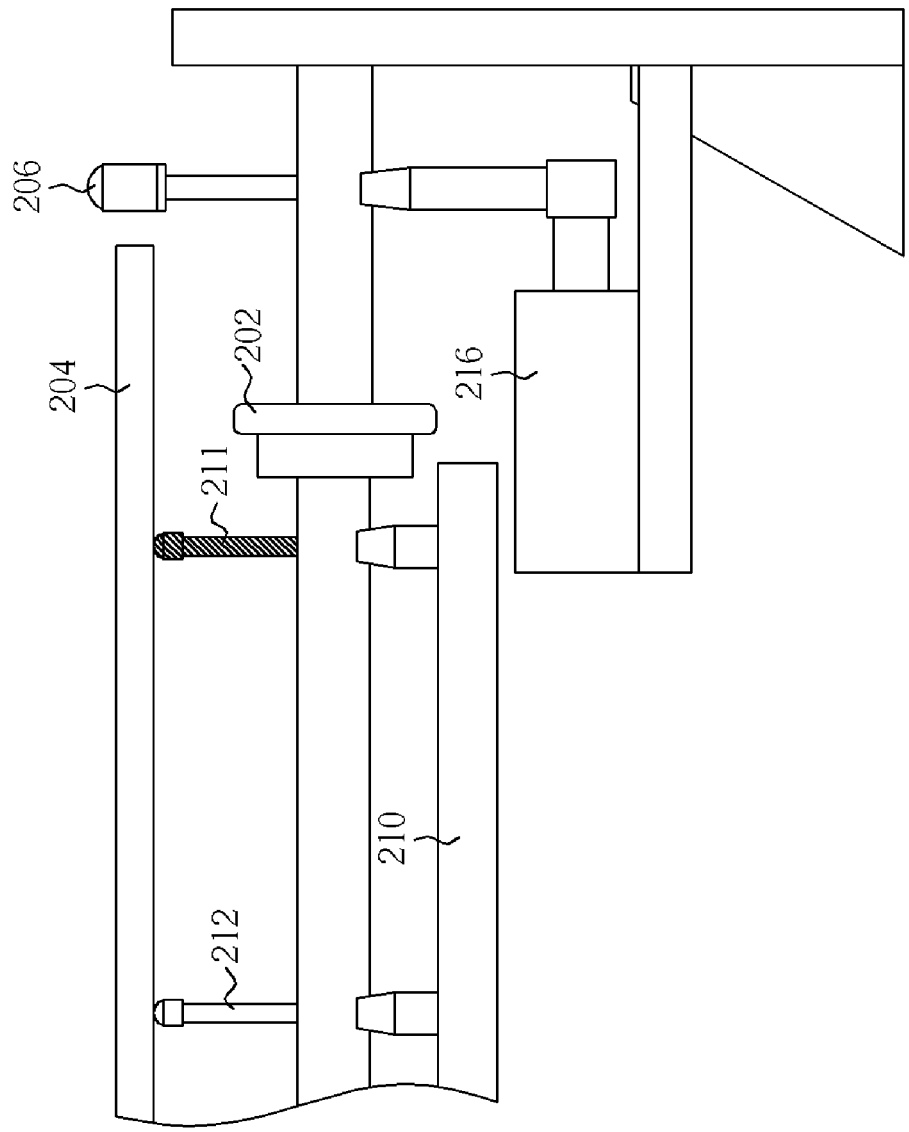
FIG. 5 is a diagram of a structure of the adjustment device shown in FIG. 2.

Please refer to FIG. 5. FIG. 5 is a diagram of a structure of the adjustment device shown in FIG. 2. When the substrate 204 is raised by the pins 211 and the joinballs 212 of the pin up device 210, the adjustment device 206 is raised to the corresponding position by the low speed pneumatic cylinder 216, resulting in a higher boundary of the substrate 204 so the substrate 204 cannot move over the boundary. In other words, the adjustment device 206 is on the two lateral sides of the adjustment apparatus 200, so when the two lateral sides are raised at the same time, the substrate 204 can be in compliance with the boundary, to complete the adjustment of the substrate 204.

Due to the width of the substrate, when the prior adjustment device adjusts the substrate, the substrate can easily break or lose a piece. The adjustment device according to the present invention, however, has the pin up device, which the joinballs and the pins. The substrate can use the point friction from the pins, and the roller friction from the joinballs, so the substrate will not fail easily, and a robot or a human being can take the substrate easily . Because the substrate is raised by the pin up device, the substrate will not break or loose a piece when the robot or human being takes it, and the yield thereby increases. Furthermore, the pins and the joinballs are positioned in a ratio of 1:1, so the cost of the adjustment apparatus decreases greatly.

Those skilled in the art will readily observe that numerous modifications and alterations of the device and method may be made while retaining the teachings of the invention. Accordingly, the above disclosure should be construed as limited only by the metes and bounds of the appended claims.

An adjustment apparatus, which is able to adjust a substrate position is disclosed. The apparatus includes a plurality of transport rails, a plurality of rollers disposed on each transport rail respectively, a pin up device and an adjustment device. The roller is for transporting the glass substrate. The pin up device includes a plurality of pins and a plurality of joinballs for supporting and raising the substrate from the roller, allowing an adjustment device to orientate the glass substrate.

What is claimed is:

1. An adjustment apparatus for orientating a substrate, said adjustment apparatus comprising:
   a plurality of transport rails;
   a plurality of rollers disposed on the plurality of transport rails respectively;
   a pin up device comprising a plurality of joinballs and a plurality of pins respectively disposed between each of the plurality of transport rails for raising said substrate from said rollers; and an adjustment device on at least one lateral side of said adjustment apparatus for orientating said substrate, wherein said adjustment device is driven by a low speed pneumatic cylinder or a low speed motor.

2. The adjustment apparatus of claim 1, wherein said substrate is a substrate of a monitor panel.

3. The adjustment apparatus of claim 2, wherein the size of said substrate is bigger than a 1300 millimeters by 1500 millimeters area.

4. The adjustment apparatus of claim 2, wherein said substrate can be a CF substrate, a TFT substrate, or a pure glass substrate.

5. The adjustment apparatus of claim 1, wherein said transports rails are driven by a linear bearing.

6. The adjustment apparatus of claim 1, wherein the top of each joinball has a running ball, which has a roller friction with said glass substrate.

7. The adjustment apparatus of claim 1, wherein each pin has a 10 millimeters radius, and the top of each pin is a 5 millimeters hemisphere, having a point friction with said substrate.

8. The adjustment apparatus of claim 1, wherein said pins are peel pins.

9. The adjustment apparatus of claim 1, wherein said joinballs and said pins intercross in a ratio of 1:1 in said pin up device.

10. The adjustment apparatus of claim 1, wherein said pin up device is driven by a low speed pneumatic cylinder or a low speed motor for raising said pin up device.

* * * * *